United States Patent
Wang et al.

(10) Patent No.: US 9,795,950 B2
(45) Date of Patent: Oct. 24, 2017

(54) CATALYST FOR PREPARING AVIATION FUEL FROM FISCHER-TROPSCH PRODUCTS AND METHOD FOR PREPARING SAID CATALYST

(71) Applicant: Wuhan Kaidi Engineering Technology Research Institute Co., Ltd., Wuhan (CN)

(72) Inventors: Wanwan Wang, Wuhan (CN); Dechen Song, Wuhan (CN); Li Xu, Wuhan (CN)

(73) Assignee: WUHAN KAIDI ENGINEERING TECHNOLOGY RESEARCH INSTITUTE CO., LTD., Wuhan (CN)

( * ) Notice: Subject to any disclaimer, the term of this patent is extended or adjusted under 35 U.S.C. 154(b) by 0 days.

(21) Appl. No.: 15/350,132

(22) Filed: Nov. 14, 2016

(65) Prior Publication Data

US 2017/0056867 A1  Mar. 2, 2017

Related U.S. Application Data

(63) Continuation-in-part of application No. PCT/CN2015/072403, filed on Feb. 6, 2015.

(30) Foreign Application Priority Data

May 14, 2014  (CN) .......................... 2014 1 0201892

(51) Int. Cl.

| | |
|---|---|
| *B01J 21/04* | (2006.01) |
| *B01J 23/28* | (2006.01) |
| *B01J 23/755* | (2006.01) |
| *B01J 23/883* | (2006.01) |
| *B01J 29/48* | (2006.01) |
| *B01J 29/78* | (2006.01) |
| *B01J 35/02* | (2006.01) |
| *B01J 37/00* | (2006.01) |
| *B01J 37/02* | (2006.01) |
| *B01J 37/04* | (2006.01) |
| *B01J 37/06* | (2006.01) |
| *B01J 37/08* | (2006.01) |
| *C10G 49/04* | (2006.01) |
| *C10G 49/08* | (2006.01) |

(52) U.S. Cl.
CPC .......... *B01J 29/7884* (2013.01); *B01J 29/48* (2013.01); *B01J 35/026* (2013.01); *B01J 37/009* (2013.01); *B01J 37/02* (2013.01); *B01J 37/0201* (2013.01); *B01J 37/04* (2013.01); *B01J 37/06* (2013.01); *B01J 37/08* (2013.01); *C10G 49/04* (2013.01); *C10G 49/08* (2013.01); *B01J 2229/16* (2013.01)

(58) Field of Classification Search
CPC ........ B01J 23/28; B01J 23/755; B01J 23/883; B01J 29/48; B01J 29/7884; B01J 35/026; B01J 37/009; B01J 37/02; B01J 37/0201; B01J 37/04; B01J 37/06; B01J 37/08; B01J 21/04
See application file for complete search history.

(56) References Cited

U.S. PATENT DOCUMENTS 7,341,657 B2 * 3/2008 Li .................. C10G 45/64
                                            208/210
8,668,894 B2 * 3/2014 Liu .................. B01D 53/8615
                                            423/244.01

* cited by examiner

*Primary Examiner* — Cam N. Nguyen
(74) *Attorney, Agent, or Firm* — Matthias Scholl P.C.; Matthias Scholl

(57) ABSTRACT

A catalyst for preparing aviation fuel from synthetic oil obtained by Fischer-Tropsch process, including: between 20 and 50 percent by weight of an amorphous aluminum silicate, between 5 and 20 percent by weight of alumina, between 20 and 60 percent by weight of a hydrothermally modified zeolite, between 0.5 and 1.0 percent by weight of a Sesbania powder, between 0.5 and 5 percent by weight of nickel oxide, and between 5 and 15 percent by weight of molybdenum oxide. The invention also provides a method for preparing the catalyst.

25 Claims, No Drawings

CATALYST FOR PREPARING AVIATION FUEL FROM FISCHER-TROPSCH PRODUCTS AND METHOD FOR PREPARING SAID CATALYST

CROSS-REFERENCE TO RELATED APPLICATIONS

This application is a continuation-in-part of International Patent Application No. PCT/CN2015/072403 with an international filing date of Feb. 6, 2015, designating the United States, now pending, and further claims foreign priority benefits to Chinese Patent Application No. 201410201892.1 filed May 14, 2014. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to a catalyst for preparing aviation fuel from synthetic oil obtained by Fischer-Tropsch process and a method for preparing the same.

Description of the Related Art

In general, synthetic oil obtained by Fischer-Tropsch process can be converted into aviation fuel by hydroisomerization in the presence of catalysts. The catalysts are supported on zeolite carriers.

However, the carriers for the catalysts are acidic and have small pores. This results in violent cracking reaction of alkanes, low selectivity for aviation fuel, and low isomerization degree of alkanes.

SUMMARY OF THE INVENTION

In view of the above-described problems, it is one objective of the invention to provide a catalyst for preparing an aviation fuel from synthetic oil obtained by Fischer-Tropsch process that has high activity and high selectivity of aviation fuel.

It is another objective of the invention to provide a preparation method of the catalyst that has high yield.

To achieve the above objective, in accordance with one embodiment of the invention, there is provided a catalyst for preparing an aviation fuel from synthetic oil obtained by Fischer-Tropsch process. The catalyst comprises: between 20 and 50 percent by weight of an amorphous aluminum silicate, between 5 and 20 percent by weight of alumina as a binder, between 20 and 60 percent by weight of a hydrothermally modified zeolite, between 0.5 and 1.0 percent by weight of a Sesbania powder, between 0.5 and 5 percent by weight of nickel oxide, and between 5 and 15 percent by weight of molybdenum oxide.

In a class of this embodiment, the catalyst comprises: between 30 and 45 percent by weight of the amorphous aluminum silicate, between 8 and 15 percent by weight of alumina as the binder, between 25 and 50 percent by weight of the hydrothermally modified zeolite, between 0.6 and 0.8 percent by weight of the Sesbania powder, between 2.5 and 4.5 percent by weight of nickel oxide, and between 8 and 12 percent by weight of molybdenum oxide.

In a class of this embodiment, the hydrothermally modified zeolite is a steam-modified dealuminized zeolite.

In a class of this embodiment, the hydrothermally modified zeolite is a steam-modified dealuminized hydrogen-type ZSM-22 zeolite.

In a class of this embodiment, the steam has a temperature of between 300 and 900° C., a pressure of between 0.1 and 2.0 megapascal, and holds between 2 and 4 hrs.

In a class of this embodiment, the steam has a temperature of between 500 and 800° C., a pressure of between 0.1 and 0.5 megapascal, and holds between 2 and 3.5 hrs.

In a class of this embodiment, the catalyst has a specific area of between 200 and 300 $m^2/g$; micropores having a pore volume of between 0.4 and 0.8 mL/g and a pore size distribution of between 4 and 10 nm accounts for between 65 and 85% of a total pore volume; and a total acidity of the catalyst measured using a $NH_3$-TPD method is between 0.4 and 1.0 mmol/g.

In accordance with another embodiment of the invention, there is provided a method for preparing the catalyst. The method comprises:
1) adding a potassium-type ZSM-22 zeolite as a raw material to a $NH_4NO_3$ solution for ion exchange, filtering, washing, and drying a resulting zeolite;
2) repeating 1) for two or three times, and calcining the zeolite to yield a hydrogen-type ZSM-22 zeolite;
3) introducing steam to the hydrogen-type ZSM-22 zeolite for hydrothermal treatment to yield the dealuminized hydrogen-type ZSM-22 zeolite;
4) mixing the dealuminized hydrogen-type ZSM-22 zeolite with the amorphous aluminum silicate, adding alumina as the binder, adding a diluted nitric acid solution for modulation, and adding the Sesbania powder as an extrusion aid, mixing, kneading, and pressing to form masses, and extruding the masses to form strips;
5) drying and calcining the strips to yield a catalyst carrier;
6) mixing a soluble molybdenum salt and a soluble nickel salt to prepare an aqueous solution, dispersing the aqueous solution by an ultrasonic wave to acquire an active soaking solution; and
7) soaking the catalyst carrier into the active soaking solution to load active components on the carrier, aging, drying, and calcining to acquire a catalyst product.

In a class of this embodiment, in 1), the potassium-type ZSM-22 zeolite has a molar ratio of $SiO_2/Al_2O_3$ is between 20 and 160.

In a class of this embodiment, in 1), the molar ratio of $SiO_2/Al_2O_3$ of the potassium-type ZSM-22 zeolite is between 30 and 100.

In a class of this embodiment, in 1), a concentration of the $NH_4NO_3$ solution is between 1.0 and 2.0 mol/L; and the potassium-type ZSM-22 zeolite was added in the $NH_4NO_3$ solution for ion exchange, the ion exchange is performed in condition of water bath at a temperature of between 60 and 110° C. for between 1 and 4 hrs.

In a class of this embodiment, in 1), the concentration of the $NH_4NO_3$ solution is between 1.0 and 1.5 mol/L; and the ion exchange is performed in condition of water bath at a temperature of between 80 and 100° C. for between 2 and 4 hrs.

In a class of this embodiment, in 3), the hydrothermal treatment of the hydrogen-type ZSM-22 zeolite by the steam is performed at a temperature of between 300 and 900° C. and a pressure of between 0.1 and 2.0 megapascal for between 2 and 4 hrs.

In a class of this embodiment, in 3), the hydrothermal treatment of the hydrogen-type ZSM-22 zeolite by the steam is performed at the temperature of between 500 and 800° C., the pressure of between 0.1 and 0.5 megapascal for between 2 and 3.5 hrs.

In a class of this embodiment, in 4), the amorphous aluminum silicate has a specific area of between 250 and 400 $m^2/g$, and $SiO_2$ accounts for between 20 and 50 w.t % of a total weight of the amorphous aluminum.

In a class of this embodiment, in 4), the amorphous aluminum silicate has a specific area of between 250 and 300 $m^2/g$, and $SiO_2$ accounts for between 30 and 50 w.t % of a total weight of the amorphous aluminum.

In a class of this embodiment, in 4), the dilute nitric acid solution has a concentration of between 3 and 8 percent by weight.

In a class of this embodiment, in 5), the strips are dried at a temperature of between 80 and 120° C. for between 6 and 24 hrs.

In a class of this embodiment, in 5), the strips are dried at a temperature of between 100 and 120° C. for between 6 and 12 hrs.

In a class of this embodiment, in 5), the strips are dried at a temperature of between 500 and 600° C. for between 4 and 8 hrs.

In a class of this embodiment, in 5), the catalyst carrier adopts a cylinder shape, a trefoil shape, or a quatrefoil shape.

In a class of this embodiment, in 6), the soluble molybdenum salt is ammonium molybdate or sodium molybdate; and the soluble nickel salt is nickel nitrate.

In a class of this embodiment, in 6), a time for the treatment of the ultrasonic wave is between 0.5 and 1.5 hrs.

In a class of this embodiment, in 7), the aging treatment is conducted at room temperature for between 12 and 24 hrs; the drying is conducted at a temperature of between 100 and 120° C. for between 10 and 14 hrs; and the calcination is conducted at a temperature of between 500 and 600° C. for between 4 and 8 hrs.

In a class of this embodiment, in 7), the aging treatment is conducted at room temperature for between 16 and 20 hrs; the drying is conducted at a temperature of between 110 and 120° C. for between 10 and 12 hrs; and the calcination is conducted at a temperature of between 550 and 600° C. for between 4 and 6 hrs.

Because the zeolite possesses a cylindrical one-dimensional 10-ring pore with a size of 0.45 nm×0.55 nm and no cross pores exists, the zeolite is only suitable for isomerization of small molecular alkanes. It is required to modify the zeolite to further enlarge the pore size when it is to be used in the isomerization of the long-chain alkanes.

The catalyst and the method of the invention are based on the characteristics of the long-chain n-alkanes of the synthetic oil obtained by Fischer-Tropsch process. The potassium-type ZSM-22 zeolite is adopted as the raw material to acquire hydrogen-type ZSM-22 zeolite by ion exchange. The hydrogen-type ZSM-22 zeolite is dealuminized by hydrothermal treatment to reduce its acidity, and the amorphous aluminum silicate which has weak acidity is mixed with the dealuminized hydrogen-type ZSM-22 zeolite according to a certain ratio to form the carrier, so that the carrier possesses proper weak acidity and pore texture. The active components Ni and Mo are thereafter loaded to the carrier to prepare the catalyst having the pore size distribution of between 4 and 10 nm which is beneficial for the isomerization of the long-chain alkanes Advantages of the catalyst for preparing the aviation fuel from the synthetic oil obtained by Fischer-Tropsch process and the method for preparing the same according to embodiments of the invention are summarized as follows: the prepared catalyst possesses high activity and high selectivity. The long-chain synthetic oil obtained by Fischer-Tropsch process is performed with hydroisomerization to yield the aviation fuel with high selectivity, during which, the isomerization degree of the long-chain alkane is increased, the freezing point of the aviation fuel distillate is reduced, and the selectivity of the aviation fuel component is improved. In the meanwhile, the catalyst has high catalytic activity, and the yield of the aviation fuel is therefore improved. The aviation fuel prepared using the catalyst of the invention reaches the standards of the national jet fuel, and is therefore suitable to substitute the existing fossil fuels.

DETAILED DESCRIPTION OF THE EMBODIMENTS

For further illustrating the invention, experiments detailing a catalyst for preparing an aviation fuel from synthetic oil obtained by Fischer-Tropsch process and a method for preparing the same are described below. It should be noted that the following examples are intended to describe and not to limit the invention.

Properties of the synthetic oil obtained by Fischer-Tropsch process prepared by biomass as the raw material are shown in Table 1.

TABLE 1

Properties of synthetic oil obtained by Fischer-Tropsch process as raw material

| Distillation range (° C.) | Density (20° C., kg/m$^3$) | Freezing point (° C.) | Viscosity (−20° C., mm$^2$/s) |
|---|---|---|---|
| 100-350 | 820 | −20 | 6.82 |

EXAMPLE 1

1) 200 g of a K-ZSM-22 zeolite having a molar ratio of $SiO_2/Al_2O_3$ of 40 was add to a $NH_4NO_3$ solution having a concentration of 1.5 mol/L according to a weight ratio of the K-ZSM-22 zeolite to the $NH_4NO_3$ solution of 1:10 for performing ion exchange. A resulting mixture was stirred at a constant temperature for 2 hrs in condition of a water bath at a temperature of 100° C. The mixture after treatment was then filtered to collect a resulting zeolite. The zeolite was then washed and dried at 120° C. for 4 hrs.

2) The operation of 1) was repeated for three times, and the zeolite was thereafter calcined at 550° C. for 6 hrs to yield an H-ZSM-22 zeolite.

3) The H-ZSM-22 zeolite was placed in a baking furnace. Steam was introduced to the baking furnace for hydrothermal treatment at 500° C. and 0.2 megapascal for 4 hrs to yield a dealuminized H-ZSM-22 zeolite.

4) 50.0 g of the dealuminized H-ZSM-22 zeolite, 125.0 g of an amorphous aluminum silicate, and 37.5 g of alumina as a binder were added to a diluted nitric acid solution having a concentration of 5.0 percent by weight for modulation. 2.0 g of a Sesbania powder as an extrusion aid was added. A resulting mixture was uniformly mixed, kneaded, pressed into masses, and the masses were then extruded to form trefoil-shaped strips.

5) The trefoil-shaped strips were placed in an oven, dried at 120° C. for 6 hrs, calcined at 500° C. for 8 hrs, and then cooled to the room temperature to yield a catalyst carrier.

6) 42.0 g of sodium molybdate and 40.8 g of nickel nitrate were mixed to form an aqueous solution, and the aqueous solution was dispersed for 1 hr to acquire an active soaking solution.

7) The catalyst carrier was soaked into the active soaking solution to load active components on the carrier. The active component-loaded carrier was then aged at room temperature for 24 hrs, dried in an oven at 100° C. for 14 hrs, calcined at 500° C. for 8 hrs, and then cooled to the room temperature to yield a catalyst A.

The catalyst A comprises: 20.0 percent by weight of a modified H-ZSM-22 zeolite, 50.0 percent by weight of the amorphous aluminum silicate, 15.0 percent by weight of alumina, 0.8 percent by weight of the Sesbania powder, 4.2 percent by weight of nickel oxide, and 10.0 percent by weight of molybdenum oxide.

Physicochemical properties of the catalyst A are listed in Table 2, and evaluation results and product properties of the catalyst A are listed in Table 3.

TABLE 2

Physicochemical properties of catalysts

| Catalyst | A | B | C | D | E | F | G | H |
|---|---|---|---|---|---|---|---|---|
| Specific area(m$^2$/g) | 263 | 248 | 233 | 251 | 260 | 294 | 275 | 218 |
| Pore volume(mL/g) | 0.53 | 0.58 | 0.50 | 0.68 | 0.75 | 0.80 | 0.59 | 0.42 |
| Average pore size(nm) | 5.89 | 8.65 | 6.05 | 8.43 | 7.92 | 7.32 | 7.11 | 6.24 |
| 4-10 nm pore size distribution (%) | 65.1 | 83.6 | 76.8 | 78.4 | 72.2 | 70.3 | 73.4 | 68.9 |
| Total acidity measured using NH$_3$-TPD method (mmol/g) | 0.80 | 0.42 | 0.57 | 0.51 | 0.62 | 0.73 | 0.65 | 0.92 |

TABLE 3

Evaluation results and properties of products

| Catalyst | A | B | C | D | E | F | G | H |
|---|---|---|---|---|---|---|---|---|
| Conversion (percent by weight) | 90.8 | 87.2 | 86.5 | 85.8 | 82.5 | 86.7 | 81.3 | 83.2 |
| Selectivity (%) of aviation fuel (150-270° C.) | 68.4 | 94.7 | 89.5 | 92.3 | 85.6 | 78.5 | 87.3 | 60.3 |
| Freezing point (° C.) | −48 | −62 | −55 | −56 | −53 | −49 | −52 | −50 |
| Density (20° C., kg/m$^3$) | 794.4 | 785.2 | 787.5 | 789.3 | 790.4 | 802.6 | 791.0 | 814.2 |
| Viscosity (−20° C., mm$^2$/s) | 4.8 | 5.1 | 5.3 | 5.6 | 5.4 | 5.2 | 6.5 | 6.1 |
| Flash point (° C.) | 48 | 60 | 56 | 58 | 55 | 50 | 52 | 50 |

EXAMPLE 2

1) 200 g of a K-ZSM-22 zeolite having a molar ratio of SiO$_2$/Al$_2$O$_3$ of 50 was add to a NH$_4$NO$_3$ solution having a concentration of 1.0 mol/L according to a weight ratio of the K-ZSM-22 zeolite to the NH$_4$NO$_3$ solution of 1:10 for performing ion exchange. A resulting mixture was stirred at a constant temperature for 4 hrs in condition of a water bath at a temperature of 80° C. The mixture after treatment was then filtered to collect a resulting zeolite. The zeolite was then washed and dried at 120° C. for 4 hrs.

2) The operation of 1) was repeated for three times, and the zeolite was thereafter calcined at 550° C. for 6 hrs to yield an H-ZSM-22 zeolite.

3) The H-ZSM-22 zeolite was placed in a baking furnace. Steam was introduced to the baking furnace for hydrothermal treatment at 650° C. and 0.1 megapascal for 3 hrs to yield a dealuminized H-ZSM-22 zeolite.

4) 50.0 g of the dealuminized H-ZSM-22 zeolite, 20.0 g of an amorphous aluminum silicate, and 19.2 g of alumina as a binder were added to a diluted nitric acid solution having a concentration of 5.0 percent by weight for modulation. 0.8 g of a Sesbania powder as an extrusion aid was added. A resulting mixture was uniformly mixed, kneaded, pressed into masses, and the masses were then extruded to form trefoil-shaped strips.

5) The trefoil-shaped strips were placed in an oven, dried at 100° C. for 12 hrs, calcined at 550° C. for 6 hrs, and then cooled to the room temperature to yield a catalyst carrier.

6) 6.8 g of ammonium molybdate and 19.5 g of nickel nitrate were mixed to form an aqueous solution, and the aqueous solution was dispersed for 1 hr to acquire an active soaking solution.

7) The catalyst carrier was soaked into the active soaking solution to load active components on the carrier. The active component-loaded carrier was then aged at room temperature for 18 hrs, dried in an oven at 120° C. for 10 hrs, calcined at 550° C. for 6 hrs, and then cooled to the room temperature to yield a catalyst B.

The catalyst B comprises: 50.0 percent by weight of a modified H-ZSM-22 zeolite, 20.0 percent by weight of the amorphous aluminum silicate, 19.2 percent by weight of alumina, 0.8 percent by weight of the Sesbania powder, 5.0 percent by weight of nickel oxide, and 5.0 percent by weight of molybdenum oxide.

Physicochemical properties of the catalyst B are listed in Table 2, and evaluation results and product properties of the catalyst B are listed in Table 3.

EXAMPLE 3

1) 200 g of a K-ZSM-22 zeolite having a molar ratio of SiO$_2$/Al$_2$O$_3$ of 60 was add to a NH$_4$NO$_3$ solution having a concentration of 2.0 mol/L according to a weight ratio of the K-ZSM-22 zeolite to the NH$_4$NO$_3$ solution of 1:10 for performing ion exchange. A resulting mixture was stirred at a constant temperature for 3 hrs in condition of a water bath at a temperature of 90° C. The mixture after treatment was then filtered to collect a resulting zeolite. The zeolite was then washed and dried at 120° C. for 4 hrs.

2) The operation of 1) was repeated for three times, and the zeolite was thereafter calcined at 550° C. for 6 hrs to yield an H-ZSM-22 zeolite.

3) The H-ZSM-22 zeolite was placed in a baking furnace. Steam was introduced to the baking furnace for hydrothermal treatment at 800° C. and 0.5 megapascal for 2 hrs to yield a dealuminized H-ZSM-22 zeolite.

4) 50.0 g of the dealuminized H-ZSM-22 zeolite, 16.7 g of an amorphous aluminum silicate, and 7.7 g of alumina as a binder were added to a diluted nitric acid solution having a concentration of 5.0 percent by weight for modulation. 0.7 g of a Sesbania powder as an extrusion aid was added. A resulting mixture was uniformly mixed, kneaded, pressed into masses, and the masses were then extruded to form trefoil-shaped strips.

5) The trefoil-shaped strips were placed in an oven, dried at 110° C. for 10 hrs, calcined at 600° C. for 4 hrs, and then cooled to the room temperature to yield a catalyst carrier.

6) 5.7 g of ammonium molybdate and 16.2 g of nickel nitrate were mixed to form an aqueous solution, and the aqueous solution was dispersed for 1 hr to acquire an active soaking solution.

7) The catalyst carrier was soaked into the active soaking solution to load active components on the carrier. The active component-loaded carrier was then aged at room temperature for 12 hrs, dried in an oven at 110° C. for 12 hrs, calcined at 600° C. for 4 hrs, and then cooled to the room temperature to yield a catalyst C.

The catalyst C comprises: 60.0 percent by weight of a modified H-ZSM-22 zeolite, 20.0 percent by weight of the amorphous aluminum silicate, 9.2 percent by weight of alumina, 0.8 percent by weight of the Sesbania powder, 5.0 percent by weight of nickel oxide, and 5.0 percent by weight of molybdenum oxide.

Physicochemical properties of the catalyst C are listed in Table 2, and evaluation results and product properties of the catalyst C are listed in Table 3.

EXAMPLE 4

1) 200 g of a K-ZSM-22 zeolite having a molar ratio of $SiO_2/Al_2O_3$ of 80 was add to a $NH_4NO_3$ solution having a concentration of 1.0 mol/L according to a weight ratio of the K-ZSM-22 zeolite to the $NH_4NO_3$ solution of 1:10 for performing ion exchange. A resulting mixture was stirred at a constant temperature for 4 hrs in condition of a water bath at a temperature of 80° C. The mixture after treatment was then filtered to collect a resulting zeolite. The zeolite was then washed and dried at 120° C. for 4 hrs.

2) The operation of 1) was repeated for three times, and the zeolite was thereafter calcined at 550° C. for 6 hrs to yield an H-ZSM-22 zeolite.

3) The H-ZSM-22 zeolite was placed in a baking furnace. Steam was introduced to the baking furnace for hydrothermal treatment at 650° C. and 0.1 megapascal for 3 hrs to yield a dealuminized H-ZSM-22 zeolite.

4) 50.0 g of the dealuminized H-ZSM-22 zeolite, 42.8 g of an amorphous aluminum silicate, and 28.6 g of alumina as a binder were added to a diluted nitric acid solution having a concentration of 5.0 percent by weight for modulation. 1.2 g of a Sesbania powder as an extrusion aid was added. A resulting mixture was uniformly mixed, kneaded, pressed into masses, and the masses were then extruded to form trefoil-shaped strips.

5) The trefoil-shaped strips were placed in an oven, dried at 120° C. for 6 hrs, calcined at 600° C. for 4 hrs, and then cooled to the room temperature to yield a catalyst carrier.

6) 23.7 g of ammonium molybdate and 11.1 g of nickel nitrate were mixed to form an aqueous solution, and the aqueous solution was dispersed for 1 hr to acquire an active soaking solution.

7) The catalyst carrier was soaked into the active soaking solution to load active components on the carrier. The active component-loaded carrier was then aged at room temperature for 24 hrs, dried in an oven at 110° C. for 12 hrs, calcined at 600° C. for 4 hrs, and then cooled to the room temperature to yield a catalyst D.

The catalyst D comprises: 35.0 percent by weight of a modified H-ZSM-22 zeolite, 30.0 percent by weight of the amorphous aluminum silicate, 20 percent by weight of alumina, 0.8 percent by weight of the Sesbania powder, 2.0 percent by weight of nickel oxide, and 12.2 percent by weight of molybdenum oxide.

Physicochemical properties of the catalyst D are listed in Table 2, and evaluation results and product properties of the catalyst D are listed in Table 3.

EXAMPLE 5

1) 200 g of a K-ZSM-22 zeolite having a molar ratio of $SiO_2/Al_2O_3$ of 90 was add to a $NH_4NO_3$ solution having a concentration of 1.0 mol/L according to a weight ratio of the K-ZSM-22 zeolite to the $NH_4NO_3$ solution of 1:10 for performing ion exchange. A resulting mixture was stirred at a constant temperature for 4 hrs in condition of a water bath at a temperature of 80° C. The mixture after treatment was then filtered to collect a resulting zeolite. The zeolite was then washed and dried at 120° C. for 4 hrs.

2) The operation of 1) was repeated for three times, and the zeolite was thereafter calcined at 550° C. for 6 hrs to yield an H-ZSM-22 zeolite.

3) The H-ZSM-22 zeolite was placed in a baking furnace. Steam was introduced to the baking furnace for hydrothermal treatment at 650° C. and 0.1 megapascal for 3 hrs to yield a dealuminized H-ZSM-22 zeolite.

4) 50.0 g of the dealuminized H-ZSM-22 zeolite, 100 g of an amorphous aluminum silicate, and 60.5 g of alumina as a binder were added to a diluted nitric acid solution having a concentration of 5.0 percent by weight for modulation. 2.0 g of a Sesbania powder as an extrusion aid was added. A resulting mixture was uniformly mixed, kneaded, pressed into masses, and the masses were then extruded to form cylinder-shaped strips.

5) The cylinder-shaped strips were placed in an oven, dried at 110° C. for 10 hrs, calcined at 500° C. for 8 hrs, and then cooled to the room temperature to yield a catalyst carrier.

6) 34.0 g of ammonium molybdate and 7.8 g of nickel nitrate were mixed to form an aqueous solution, and the aqueous solution was dispersed for 1 hr to acquire an active soaking solution.

7) The catalyst carrier was soaked into the active soaking solution to load active components on the carrier. The active component-loaded carrier was then aged at room temperature for 12 hrs, dried in an oven at 100° C. for 14 hrs, calcined at 500° C. for 8 hrs, and then cooled to the room temperature to yield a catalyst E.

The catalyst E comprises: 20.0 percent by weight of a modified H-ZSM-22 zeolite, 40.0 percent by weight of the amorphous aluminum silicate, 24.2 percent by weight of alumina, 0.8 percent by weight of the Sesbania powder, 5.0 percent by weight of nickel oxide, and 10.0 percent by weight of molybdenum oxide.

Physicochemical properties of the catalyst E are listed in Table 2, and evaluation results and product properties of the catalyst E are listed in Table 3.

EXAMPLE 6

1) 200 g of a K-ZSM-22 zeolite having a molar ratio of $SiO_2/Al_2O_3$ of 100 was add to a $NH_4NO_3$ solution having a concentration of 2.0 mol/L according to a weight ratio of the K-ZSM-22 zeolite to the $NH_4NO_3$ solution of 1:10 for performing ion exchange. A resulting mixture was stirred at a constant temperature for 3 hrs in condition of a water bath at a temperature of 90° C. The mixture after treatment was then filtered to collect a resulting zeolite. The zeolite was then washed and dried at 120° C. for 4 hrs.

2) The operation of 1) was repeated for three times, and the zeolite was thereafter calcined at 550° C. for 6 hrs to yield an H-ZSM-22 zeolite.

3) The H-ZSM-22 zeolite was placed in a baking furnace. Steam was introduced to the baking furnace for hydrothermal treatment at 800° C. and 0.5 megapascal for 2 hrs to yield a dealuminized H-ZSM-22 zeolite.

4) 50.0 g of the dealuminized H-ZSM-22 zeolite, 100.0 g of an amorphous aluminum silicate, and 48.0 g of alumina as a binder were added to a diluted nitric acid solution having a concentration of 5.0 percent by weight for modulation. 2.0 g of a Sesbania powder as an extrusion aid was added. A resulting mixture was uniformly mixed, kneaded, pressed into masses, and the masses were then extruded to form quatrefoil-shaped strips.

5) The quatrefoil-shaped strips were placed in an oven, dried at 120° C. for 6 hrs, calcined at 500° C. for 6 hrs, and then cooled to the room temperature to yield a catalyst carrier.

6) 51.1 g of ammonium molybdate and 7.8 g of nickel nitrate were mixed to form an aqueous solution, and the aqueous solution was dispersed for 1 hr to acquire an active soaking solution.

7) The catalyst carrier was soaked into the active soaking solution to load active components on the carrier. The active component-loaded carrier was then aged at room temperature for 20 hrs, dried in an oven at 120° C. for 10 hrs, calcined at 550° C. for 6 hrs, and then cooled to the room temperature to yield a catalyst F.

The catalyst F comprises: 20.0 percent by weight of a modified H-ZSM-22 zeolite, 40.0 percent by weight of the amorphous aluminum silicate, 19.2 percent by weight of alumina, 0.8 percent by weight of the Sesbania powder, 5.0 percent by weight of nickel oxide, and 15.0 percent by weight of molybdenum oxide.

Physicochemical properties of the catalyst F are listed in Table 2, and evaluation results and product properties of the catalyst E are listed in Table 3.

EXAMPLE 7

1) 200 g of a K-ZSM-22 zeolite having a molar ratio of $SiO_2/Al_2O_3$ of 30 was add to a $NH_4NO_3$ solution having a concentration of 2.0 mol/L according to a weight ratio of the K-ZSM-22 zeolite to the $NH_4NO_3$ solution of 1:10 for performing ion exchange. A resulting mixture was stirred at a constant temperature for 3 hrs in condition of a water bath at a temperature of 90° C. The mixture after treatment was then filtered to collect a resulting zeolite. The zeolite was then washed and dried at 120° C. for 4 hrs.

2) The operation of 1) was repeated for three times, and the zeolite was thereafter calcined at 550° C. for 6 hrs to yield an H-ZSM-22 zeolite.

3) The H-ZSM-22 zeolite was placed in a baking furnace. Steam was introduced to the baking furnace for hydrothermal treatment at 800° C. and 0.5 megapascal for 2 hrs to yield a dealuminized H-ZSM-22 zeolite.

4) 50.0 g of the dealuminized H-ZSM-22 zeolite, 41.3 g of an amorphous aluminum silicate, and 18.8 g of alumina as a binder were added to a diluted nitric acid solution having a concentration of 5.0 percent by weight for modulation. 1.0 g of a Sesbania powder as an extrusion aid was added. A resulting mixture was uniformly mixed, kneaded, pressed into masses, and the masses were then extruded to form quatrefoil-shaped strips.

5) The quatrefoil-shaped strips were placed in an oven, dried at 100° C. for 10 hrs, calcined at 500° C. for 8 hrs, and then cooled to the room temperature to yield a catalyst carrier.

6) 17.0 g of ammonium molybdate and 5.8 g of nickel nitrate were mixed to form an aqueous solution, and the aqueous solution was dispersed for 1 hr to acquire an active soaking solution.

7) The catalyst carrier was soaked into the active soaking solution to load active components on the carrier. The active component-loaded carrier was then aged at room temperature for 24 hrs, dried in an oven at 100° C. for 14 hrs, calcined at 500° C. for 8 hrs, and then cooled to the room temperature to yield a catalyst G.

The catalyst G comprises: 40.0 percent by weight of a modified H-ZSM-22 zeolite, 33.0 percent by weight of the amorphous aluminum silicate, 15 percent by weight of alumina, 0.8 percent by weight of the Sesbania powder, 1.2 percent by weight of nickel oxide, and 10.0 percent by weight of molybdenum oxide.

Physicochemical properties of the catalyst G are listed in Table 2, and evaluation results and product properties of the catalyst G are listed in Table 3.

EXAMPLE 8

1) 200 g of a K-ZSM-22 zeolite having a molar ratio of $SiO_2/Al_2O_3$ of 30 was add to a $NH_4NO_3$ solution having a concentration of 1.5 mol/L according to a weight ratio of the K-ZSM-22 zeolite to the $NH_4NO_3$ solution of 1:10 for performing ion exchange. A resulting mixture was stirred at a constant temperature for 2 hrs in condition of a water bath at a temperature of 100° C. The mixture after treatment was then filtered to collect a resulting zeolite. The zeolite was then washed and dried at 120° C. for 4 hrs.

2) The operation of 1) was repeated for three times, and the zeolite was thereafter calcined at 550° C. for 6 hrs to yield an H-ZSM-22 zeolite.

3) The H-ZSM-22 zeolite was placed in a baking furnace. Steam was introduced to the baking furnace for hydrothermal treatment at 500° C. and 0.2 megapascal for 4 hrs to yield a dealuminized H-ZSM-22 zeolite.

4) 50.0 g of the dealuminized H-ZSM-22 zeolite, 18.2 g of an amorphous aluminum silicate, and 7.5 g of alumina as a binder were added to a diluted nitric acid solution having a concentration of 5.0 percent by weight for modulation. 0.7 g of a Sesbania powder as an extrusion aid was added. A resulting mixture was uniformly mixed, kneaded, pressed into masses, and the masses were then extruded to form quatrefoil-shaped strips.

5) The quatrefoil-shaped strips were placed in an oven, dried at 100° C. for 12 hrs, calcined at 600° C. for 4 hrs, and then cooled to the room temperature to yield a catalyst carrier.

6) 18.6 g of ammonium molybdate and 4.3 g of nickel nitrate were mixed to form an aqueous solution, and the aqueous solution was dispersed for 1 hr to acquire an active soaking solution.

7) The catalyst carrier was soaked into the active soaking solution to load active components on the carrier. The active component-loaded carrier was then aged at room temperature for 12 hrs, dried in an oven at 120° C. for 10 hrs, calcined at 600° C. for 4 hrs, and then cooled to the room temperature to yield a catalyst H.

The catalyst H comprises: 55.0 percent by weight of a modified H-ZSM-22 zeolite, 20.0 percent by weight of the amorphous aluminum silicate, 8.2 percent by weight of alumina, 0.8 percent by weight of the Sesbania powder, 1.0 percent by weight of nickel oxide, and 15.0 percent by weight of molybdenum oxide.

Physicochemical properties of the catalyst H are listed in Table 2, and evaluation results and product properties of the catalyst H are listed in Table 3.

It is known from Table 3 that when adopting the catalyst of the invention, the aviation fuel has much higher selectivity and conversion and very low freezing point, which satisfies the requirement of GB 6537-2006 No. 3 jet fuel.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A catalyst, comprising:
   between 20 and 50 percent by weight of an amorphous aluminum silicate;
   between 5 and 20 percent by weight of alumina;
   between 20 and 60 percent by weight of a hydrothermally modified zeolite;
   between 0.5 and 1.0 percent by weight of a Sesbania powder;
   between 0.5 and 5 percent by weight of nickel oxide; and
   between 5 and 15 percent by weight of molybdenum oxide.

2. The catalyst of claim 1, comprising:
   between 30 and 45 percent by weight of the amorphous aluminum silicate;
   between 8 and 15 percent by weight of alumina;
   between 25 and 50 percent by weight of the hydrothermally modified zeolite;
   between 0.6 and 0.8 percent by weight of the Sesbania powder;
   between 2.5 and 4.5 percent by weight of nickel oxide; and
   between 8 and 12 percent by weight of molybdenum oxide.

3. The catalyst of claim 1, wherein the hydrothermally modified zeolite is a steam-modified dealuminized ZSM-22 zeolite.

4. The catalyst of claim 1, wherein the hydrothermally modified zeolite is a steam-modified dealuminized hydrogen-type ZSM-22 zeolite.

5. The catalyst of claim 4, wherein the steam has a temperature of between 300 and 900° C., a pressure of between 0.1 and 2.0 megapascal, and holds for between 2 and 4 hrs.

6. The catalyst of claim 4, wherein the steam has a temperature of between 500 and 800° C., a pressure of between 0.1 and 0.5 megapascal, and holds between 2 and 3.5 hrs.

7. The catalyst of claim 1, wherein the catalyst has a specific area of between 200 and 300 m²/g; micropores of the catalyst having a pore volume of between 0.4 and 0.8 mL/g and a pore size distribution of between 4 and 10 nm accounts for between 65 and 85% of total pores; and a total acidity of the catalyst measured using a NH$_3$-TPD method is between 0.4 and 1.0 mmol/g.

8. A method for preparing the catalyst of claim 4, comprising:

1) adding a potassium-type ZSM-22 zeolite to a NH$_4$NO$_3$ solution for ion exchange, filtering, washing, and drying a resulting zeolite;
2) repeating 1) for two or three times, and calcining the zeolite to yield a hydrogen-type ZSM-22 zeolite;
3) introducing steam to the hydrogen-type ZSM-22 zeolite for hydrothermal treatment to yield the dealuminized hydrogen-type ZSM-22 zeolite;
4) mixing the dealuminized hydrogen-type ZSM-22 zeolite with the amorphous aluminum silicate, adding alumina as the binder, adding a diluted nitric acid solution for modulation, and adding the Sesbania powder as an extrusion aid, mixing, kneading, and pressing to form masses, and extruding the masses to form strips;
5) drying and calcining the strips to yield a catalyst carrier;
6) mixing a soluble molybdenum salt and a soluble nickel salt to prepare an aqueous solution, dispersing the aqueous solution by an ultrasonic wave to acquire an active soaking solution; and
7) soaking the catalyst carrier into the active soaking solution to load active components on the carrier, aging, drying, and calcining to acquire a catalyst product.

9. The method of claim 8, wherein in 1), the potassium-type ZSM-22 zeolite has a molar ratio of SiO$_2$/Al$_2$O$_3$ is between 20 and 160.

10. The method of claim 8, wherein in 1), the molar ratio of SiO$_2$/Al$_2$O$_3$ of the potassium-type ZSM-22 zeolite is between 30 and 100.

11. The method of claim 8, wherein in 1), a concentration of the NH$_4$NO$_3$ solution is between 1.0 and 2.0 mol/L; and the potassium-type ZSM-22 zeolite was added in the NH$_4$NO$_3$ solution for ion exchange, the ion exchange is performed in condition of water bath at a temperature of between 60 and 110° C. for between 1 and 4 hrs.

12. The method of claim 8, wherein in 1), the concentration of the NH$_4$NO$_3$ solution is between 1.0 and 1.5 mol/L; and the ion exchange is performed in condition of water bath at a temperature of between 80 and 100° C. for between 2 and 4 hrs.

13. The method of claim 8, wherein in 3), the hydrothermal treatment of the hydrogen-type ZSM-22 zeolite by the steam is performed at a temperature of between 300 and 900° C. and a pressure of between 0.1 and 2.0 megapascal for between 2 and 4 hrs.

14. The method of claim 8, wherein in 3), the hydrothermal treatment of the hydrogen-type ZSM-22 zeolite by the steam is performed at the temperature of between 500 and 800° C., the pressure of between 0.1 and 0.5 megapascal for between 2 and 3.5 hrs.

15. The method of claim 8, wherein in 4), the amorphous aluminum silicate has a specific area of between 250 and 400 m²/g, and SiO$_2$ accounts for between 20 and 50 w.t % of a total weight of the amorphous aluminum.

16. The method of claim 8, wherein in 4), the amorphous aluminum silicate has a specific area of between 250 and 300 m²/g, and SiO$_2$ accounts for between 30 and 50 w.t % of a total weight of the amorphous aluminum.

17. The method of claim 8, wherein in 4), the dilute nitric acid solution has a concentration of between 3 and 8 percent by weight.

18. The method of claim 8, wherein in 5), the strips are dried at a temperature of between 80 and 120° C. for between 6 and 24 hrs.

19. The method of claim 8, wherein in 5), the strips are dried at a temperature of between 100 and 120° C. for between 6 and 12 hrs.

20. The method of claim 8, wherein in 5), the strips are dried at a temperature of between 500 and 600° C. for between 4 and 8 hrs.

21. The method of claim 8, wherein in 5), the catalyst carrier adopts a cylinder shape, a trefoil shape, or a quatrefoil shape.

22. The method of claim 8, wherein in 6), the soluble molybdenum salt is ammonium molybdate or sodium molybdate; and the soluble nickel salt is nickel nitrate.

23. The method of claim 8, wherein in 6), a time for the treatment of the ultrasonic wave is between 0.5 and 1.5 hrs.

24. The method of claim 8, wherein in 7), the aging treatment is conducted at room temperature for between 12 and 24 hrs; the drying is conducted at a temperature of between 100 and 120° C. for between 10 and 14 hrs; and the calcination is conducted at a temperature of between 500 and 600° C. for between 4 and 8 hrs.

25. The method of claim 8, wherein in 7), the aging treatment is conducted at room temperature for between 16 and 20 hrs; the drying is conducted at a temperature of between 110 and 120° C. for between 10 and 12 hrs; and the calcination is conducted at a temperature of between 550 and 600° C. for between 4 and 6 hrs.

\* \* \* \* \*